United States Patent
Pantalone et al.

(10) Patent No.: US 11,661,177 B2
(45) Date of Patent: May 30, 2023

(54) FOLD-OUT PROPELLER TIP EXTENSIONS

(71) Applicant: Wing Aviation LLC, Mountain View, CA (US)

(72) Inventors: Giulia Pantalone, Redwood City, CA (US); André Prager, Sunnyvale, CA (US)

(73) Assignee: WING AVIATION LLC, Mountain View, CA (US)

( * ) Notice: Subject to any disclaimer, the term of this patent is extended or adjusted under 35 U.S.C. 154(b) by 368 days.

(21) Appl. No.: 16/937,279

(22) Filed: Jul. 23, 2020

(65) Prior Publication Data

US 2022/0024569 A1 Jan. 27, 2022

(51) Int. Cl.
| | |
|---|---|
| *B64C 27/57* | (2006.01) |
| *B64C 27/46* | (2006.01) |
| *B64C 27/473* | (2006.01) |
| *B64C 11/20* | (2006.01) |
| *B64C 39/02* | (2023.01) |
| *B64C 27/39* | (2006.01) |
| *B64C 27/72* | (2006.01) |

(Continued)

(52) U.S. Cl.
CPC ............. *B64C 27/57* (2013.01); *B64C 11/20* (2013.01); *B64C 27/39* (2013.01); *B64C 27/463* (2013.01); *B64C 27/473* (2013.01); *B64C 39/024* (2013.01); *B64C 2027/7294* (2013.01); *B64U 10/13* (2023.01); *B64U 30/20* (2023.01)

(58) Field of Classification Search
CPC ....... B64C 27/57; B64C 27/39; B64C 27/463; B64C 27/473; B64C 2027/7294; B64C 11/20; B64C 27/46; F05D 2240/307
See application file for complete search history.

(56) References Cited

U.S. PATENT DOCUMENTS

| | | | | |
|---|---|---|---|---|
| 1,922,866 | A | * 8/1933 | Rosenberg | ............ B64C 27/021 |
| | | | | 416/88 |
| 4,142,697 | A | * 3/1979 | Fradenburgh | ........... B64C 27/46 |
| | | | | 416/34 |

(Continued)

FOREIGN PATENT DOCUMENTS

| | | |
|---|---|---|
| CN | 104443376 A | 3/2015 |
| CN | 106986018 A | 7/2017 |

(Continued)

OTHER PUBLICATIONS

Xie et al., Abstract Title: "A novel folding blade of wind turbine rotor for effective power control," Science Direct, 2015, abstract available at https://www.sciencedirect.com/science/article/pii/S0196890415004847.

*Primary Examiner* — Philip J Bonzell
(74) *Attorney, Agent, or Firm* — McDonnell Boehnen Hulbert & Berghoff LLP

(57) ABSTRACT

A propeller blade for an unmanned aerial vehicle ("UAV") is disclosed. The UAV includes a plurality of lift propellers and at least one thrust propeller. Each of the plurality of thrust propellers includes a thrust propeller blade coupled to a hub of the thrust propeller. The thrust propeller blade is configured such that a centrifugal force acting on the thrust propeller blade causes a thrust propeller disk area to increase from a first disk area when the UAV is in a first operational state to a second disk area when the UAV is in a second operational state.

15 Claims, 15 Drawing Sheets

(51) Int. Cl.
*B64U 10/13* (2023.01)
*B64U 30/20* (2023.01)

(56) References Cited

U.S. PATENT DOCUMENTS

| | | | | |
|---|---|---|---|---|
| 5,253,979 | A * | 10/1993 | Fradenburgh | B64C 27/46 416/223 R |
| 5,620,303 | A * | 4/1997 | Moffitt | B64C 11/003 416/89 |
| 5,636,969 | A * | 6/1997 | Matuska | B64C 11/003 416/89 |
| 5,655,879 | A * | 8/1997 | Kiely | B64C 11/003 416/89 |
| 6,019,578 | A * | 2/2000 | Hager | B64C 11/003 416/169 R |
| 6,030,177 | A * | 2/2000 | Hager | F03D 1/0608 416/88 |
| 6,398,497 | B1 * | 6/2002 | Federici | B64C 11/28 416/244 R |
| 6,578,793 | B2 * | 6/2003 | Byrnes | B64C 27/473 244/6 |
| 8,152,466 | B2 * | 4/2012 | Gandhi | B64C 27/46 416/88 |
| 8,485,782 | B2 * | 7/2013 | Turmanidze | B64C 27/46 416/88 |
| 9,592,910 | B1 | 3/2017 | Beckman et al. | |
| 10,106,251 | B2 | 10/2018 | Foskey et al. | |
| 10,287,006 | B1 | 5/2019 | Beckman et al. | |
| 10,370,098 | B1 | 8/2019 | Beckman et al. | |
| 10,407,160 | B2 | 9/2019 | Goldman | |
| 11,203,421 | B1 * | 12/2021 | Knoll | B64C 29/0033 |
| 11,273,910 | B2 * | 3/2022 | Thompson | B64C 11/003 |
| 11,370,536 | B2 * | 6/2022 | Knoll | B64D 45/0005 |
| 11,407,504 | B2 * | 8/2022 | Knoll | B64D 45/0005 |
| 2009/0290981 | A1 * | 11/2009 | Gandhi | B64C 27/46 416/1 |
| 2009/0304507 | A1 * | 12/2009 | Dehlsen | F03D 7/0236 416/87 |
| 2010/0150717 | A1 * | 6/2010 | Turmanidze | B64C 27/46 138/31 |
| 2018/0072410 | A1 * | 3/2018 | Johnson | B64C 27/473 |
| 2018/0222579 | A1 * | 8/2018 | Simon | B64C 27/473 |
| 2018/0362155 | A1 * | 12/2018 | Tweedt | B64C 11/48 |
| 2021/0394888 | A1 * | 12/2021 | Thompson | B64C 27/20 |
| 2021/0394893 | A1 * | 12/2021 | Knoll | F01D 11/22 |
| 2021/0394895 | A1 * | 12/2021 | Knoll | B64C 11/001 |
| 2021/0394898 | A1 * | 12/2021 | Knoll | B64F 5/60 |
| 2021/0396247 | A1 * | 12/2021 | Knoll | B64C 11/20 |
| 2022/0063798 | A1 * | 3/2022 | Johnson | B64C 39/024 |

FOREIGN PATENT DOCUMENTS

| | | |
|---|---|---|
| CN | 207292417 U | 5/2018 |
| CN | 208278322 U | 12/2018 |
| CN | 209192205 U | 8/2019 |
| EP | 2631179 B1 | 4/2015 |
| KR | 101726652 B1 | 4/2017 |
| KR | 20200028578 A | 3/2020 |
| WO | WO 2013077718 | 5/2013 |

* cited by examiner

FOLD-OUT PROPELLER TIP EXTENSIONS

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Unmanned aerial vehicles (UAVs) may be used to deliver a payload to, or retrieve a payload from, an individual or business. Propellers are commonly used to provide thrust and/or lift propulsion to a UAV. Propeller disk area is a main driver of propeller efficiency, and as such, devices, apparatuses, systems that allow for a larger disk area are desirable. However, the size, shape, and dimensions of a UAV may create an upper limit on the diameter of a propeller that can be installed. Beneficially, some examples described herein include a propeller design wherein distal ends of the propeller blade are movable such that potential conflicts between the propeller and a landing environment, for example, are reduced. Other examples provide movable distal ends of propeller blades in order to reduce drag on the UAV when in certain operations, such as forward flight operations, for example.

Example propeller blades and related systems described herein may be utilized by propellers installed on UAVs. Particularly, multirotor UAVs with separate lift and thrust propulsion systems are considered. The forward thrust propellers described herein include a distal end that is movable, foldable, and/or biased to have a larger diameter when spinning than when stationary. Moreover, centrifugal forces acting on the propeller blade may cause the blade to expand and inscribe a circle of larger diameter than when the propeller is stationary.

In one embodiment, a UAV with a plurality of lift propellers and at least one thrust propeller is described. The plurality of lift propellers are configured to provide lift to the UAV while the at least one thrust propeller is configured to provide thrust to the UAV. Each thrust propeller includes a thrust propeller blade coupled to a hub of the thrust propeller. A centrifugal force acting on the thrust propeller blade causes a thrust propeller disk area to increase from a first disk area when the UAV is in a first operational state to a second disk area when the UAV is in a second operational state.

In some examples, the first operational state may include operations in which the lift propellers are operating, but the thrust propellers are not operating. For example, the first operational state may include a takeoff operation or a landing operation where the UAV takes off or lands vertically. In other examples, the thrust propeller may be operating during the first operational state, but may be operating below a threshold rotations per minute ("RPM"). The second operational state may include operations in which the thrust propeller is in operation, and/or are in operation at or above the threshold RPM. The threshold RPM may be correlated to a threshold centrifugal force that causes the propeller disk area to increase.

In further embodiments, each thrust propeller blade includes a proximate portion coupled to the hub as well as a distal portion coupled to the proximate portion. The distal portion is configured to move relative to the proximate portion, and the centrifugal force acting on the thrust propeller blade causes the distal portion to move relative to the proximate portion. In some examples, the magnitude of the centrifugal force causing the distal portion to move is greater than or equal to a threshold centrifugal force.

In another embodiment, another UAV is described. The UAV includes a first plurality of propellers and a second plurality of propellers. The first plurality of propellers are configured to operate during takeoff or landing operations while the second plurality of propellers are configured to operate during forward flight operation. Each of the second plurality of propellers has a larger disk area during forward flight operation than during takeoff or landing operations. Within examples, each of the second plurality of propellers includes an extendable propeller blade such that a diameter of each of the second plurality of propellers is larger during forward flight operation than during at least one of the takeoff or landing operation. In such examples, a centrifugal force acting on the second plurality of propellers may cause the extendable propeller blade to extend.

In another embodiment, another UAV is described. The UAV includes a first plurality of propellers and a second plurality of propellers. The first plurality of propellers are configured to operate during takeoff or landing operations while the second plurality of propellers are configured to operate during forward flight operation. Each of the first plurality propellers has a larger disk area during takeoff or landing operations than during forward flight operation. Within examples, each of the first plurality of propellers includes an extendable propeller blade such that a diameter of each of the first plurality of propellers is larger during takeoff or landing operations than during forward flight operation. In such examples, a centrifugal force acting on the first plurality of propellers may cause the extendable propeller blade to extend.

In another embodiment, a method is described. The method includes operating a plurality of propellers of a UAV below a threshold RPM when the UAV is in at least one of a takeoff or landing operation. The method also includes operating the plurality of propellers above the threshold RPM when the UAV is in a forward flight operation. A disk area of each of the plurality of propellers is larger during the forward flight operation than during at least one of the takeoff or landing operation.

In some examples, the propellers include a propeller blade, and the propeller blade includes a distal portion that is configured to move relative to a proximate portion. The method may include increasing the RPMs of the propellers such that a centrifugal force causes the distal portion to move relative to the proximate portion. In yet further examples, the threshold RPM is based on a threshold centrifugal force and a centrifugal force greater than or equal to the threshold centrifugal force causes the disk area to be larger during forward flight operation than during at least one of the takeoff or landing operation.

In further aspects, any type of device or system could be used or configured as a means for performing functions of any of the methods described herein (or any portions of the methods described herein). For example, a UAV system that includes a plurality of propellers includes means to operate the plurality of propellers.

These as well as other aspects, advantages, and alternatives will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation

DETAILED DESCRIPTION

Figure 1A:
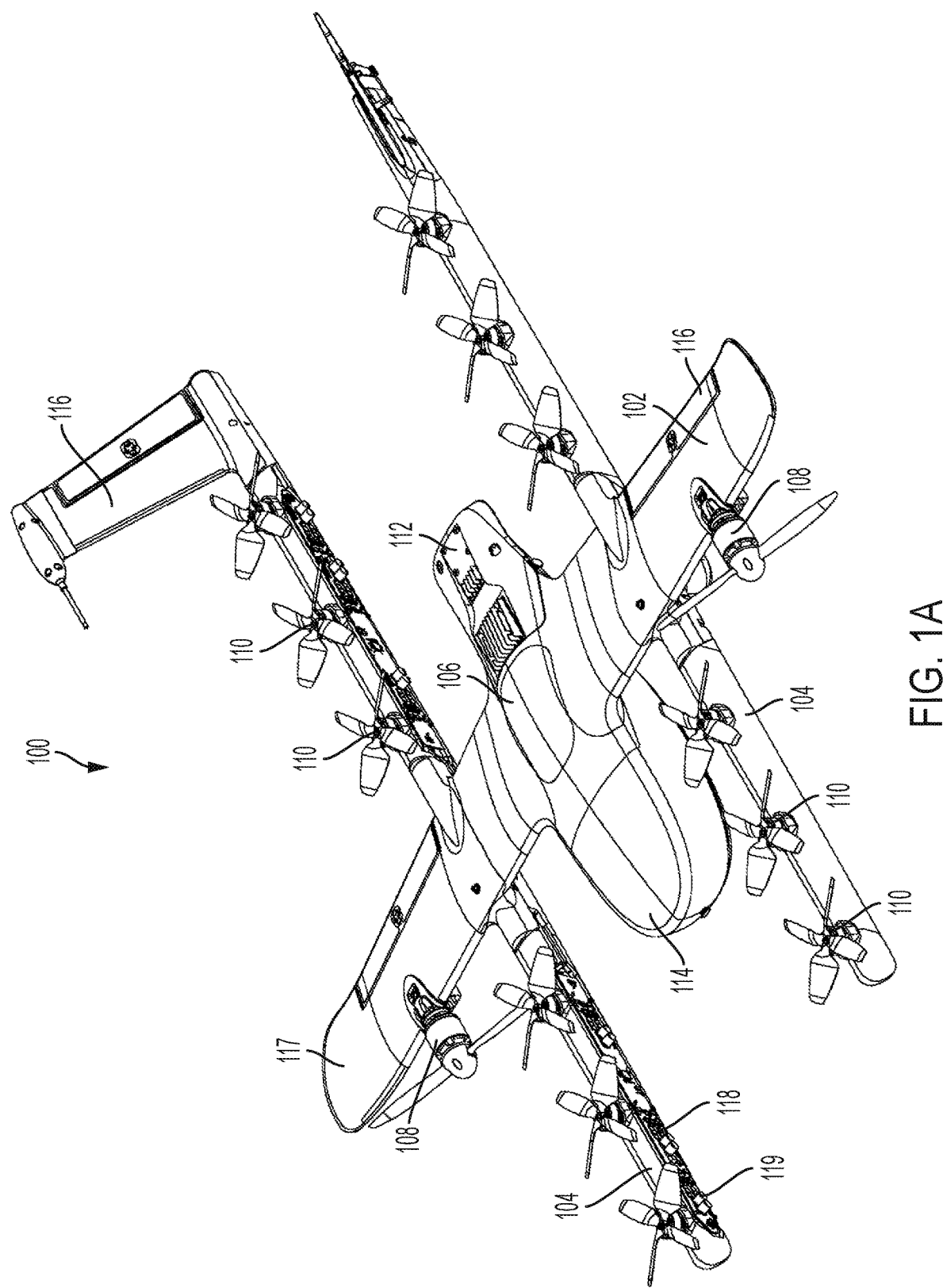
FIG. 1A is a simplified illustration of an unmanned aerial vehicle (UAV), according to an example embodiment.

Example methods, systems, and devices are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Exemplary embodiments may include, be implemented as part of, or take of the form of an aerial vehicle or system related thereto. In example embodiments, a UAV may include rotor units operable to provide thrust or lift for the UAV for transport and delivery of a payload. Herein, the terms "unmanned aerial vehicle" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

A UAV may include one or more propulsion systems in order to generate lift and/or thrust. Some propulsion systems utilize propeller units (which may also be considered rotor units or propellers) that may include a hub and propeller blades coupled to the hub. As the hub and propeller blades spin, the propeller blades sweep-out a circular area known as the disk area. Propeller disk area is an important aspect of propeller efficiency, and large disk areas are generally more desirable. However, physical parameters of the UAV configuration may place a limit on the propeller disk area. For example, in some instances if a propeller sweeps an area too large, it may conflict or come into contact with the surrounding environment. This could cause damage to the propeller unit, propeller blade, and/or surrounding environment. In other instances, smaller disk areas may result in less drag on the UAV during forward flight.

In some example UAVs, separate lift and propulsion systems may be considered. For example, a UAV may have one or more propeller units dedicated to providing lift as well as one or more separate propeller units dedicated to providing thrust. Utilizing propellers for flight, the lift propeller units may rotate and sweep-out a disk area that is generally parallel to a horizon, ground surface, or landing surface. In this orientation, the lift propeller units provide for the UAV to travel vertically relative to a ground surface. The thrust propeller units may rotate and sweep-out a disk area that is generally perpendicular to a horizon, ground surface, or landing surface. The thrust propeller units provide for the UAV to travel horizontally across the ground surface, for example.

In order to increase propeller disk area while reducing possible conflict between propeller blades and surfaces in the UAV environment, propeller blades with a distal portion that is configured to move relative a proximate portion of the propeller blade are described herein. In other embodiments, lift propellers are configured with a distal portion that can move relative to a proximate portion such that during forward flight the lift propellers have a reduced disk area and provide less drag on the vehicle. Within examples, centrifugal force acting on the described propeller blades causes the distal portion to move relative to the proximate portion when the propeller blades rotate at or above a predetermined threshold rotations per minute. More specifically, the centrifugal force causes the disk area of the propeller unit to increase. In some instances, such propeller units are only utilized for thrust propulsion so that during vertical take-off or landing operations the thrust propeller units may have a first disk area that is smaller than a second disk area when the thrust propeller units are providing thrust to the UAV. In other instances, such propeller units are utilized for lift propulsion so that during forward flight the lift propeller units may have a first disk area that is smaller than a second disk area when the lift propeller units are providing lift to the UAV.

The Figures described in detail below are for illustrative purposes only and may not reflect all components or connections. Further, as illustrations the Figures may not reflect actual operating conditions, but are merely to illustrate embodiments described. Further still, the relative dimensions and angles in the Figures may not be to scale, but are merely to illustrate the embodiments described.

II. Illustrative Unmanned Vehicles

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
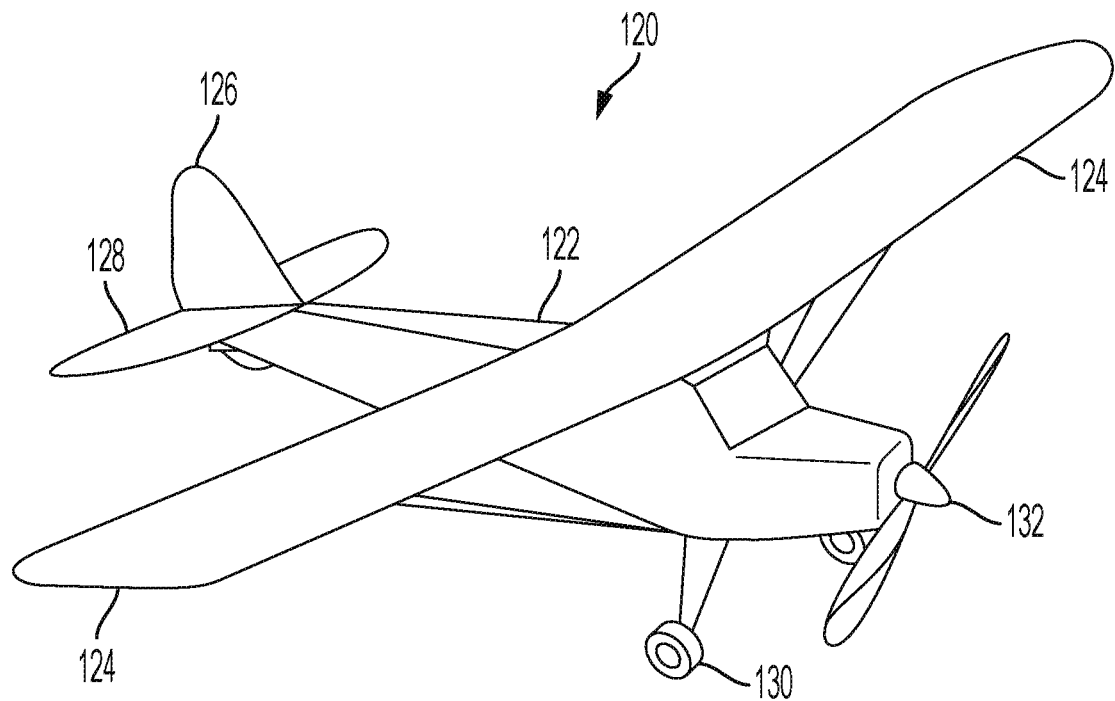
FIG. 1B is a simplified illustration of a UAV, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
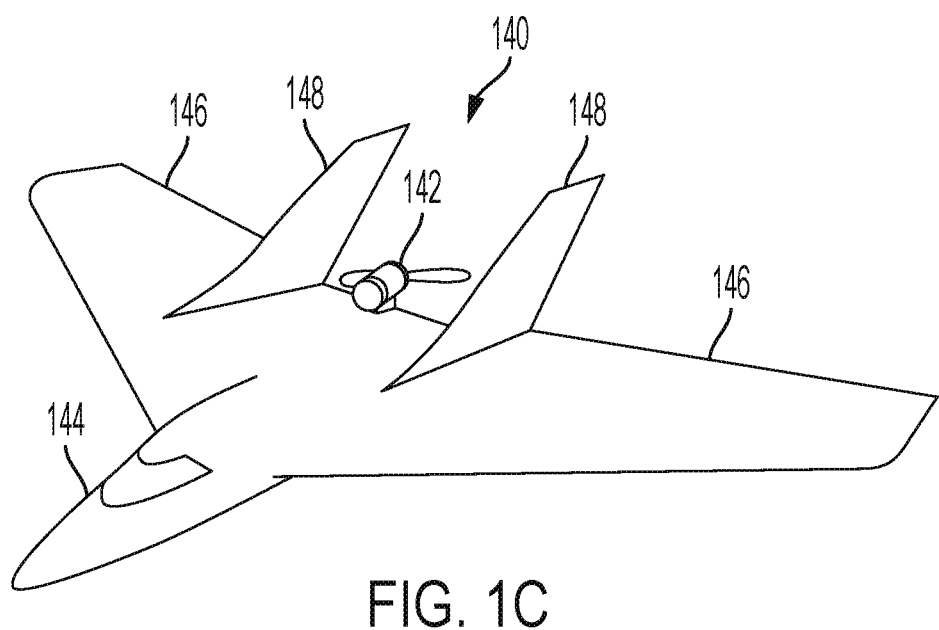
FIG. 1C is a simplified illustration of a UAV, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
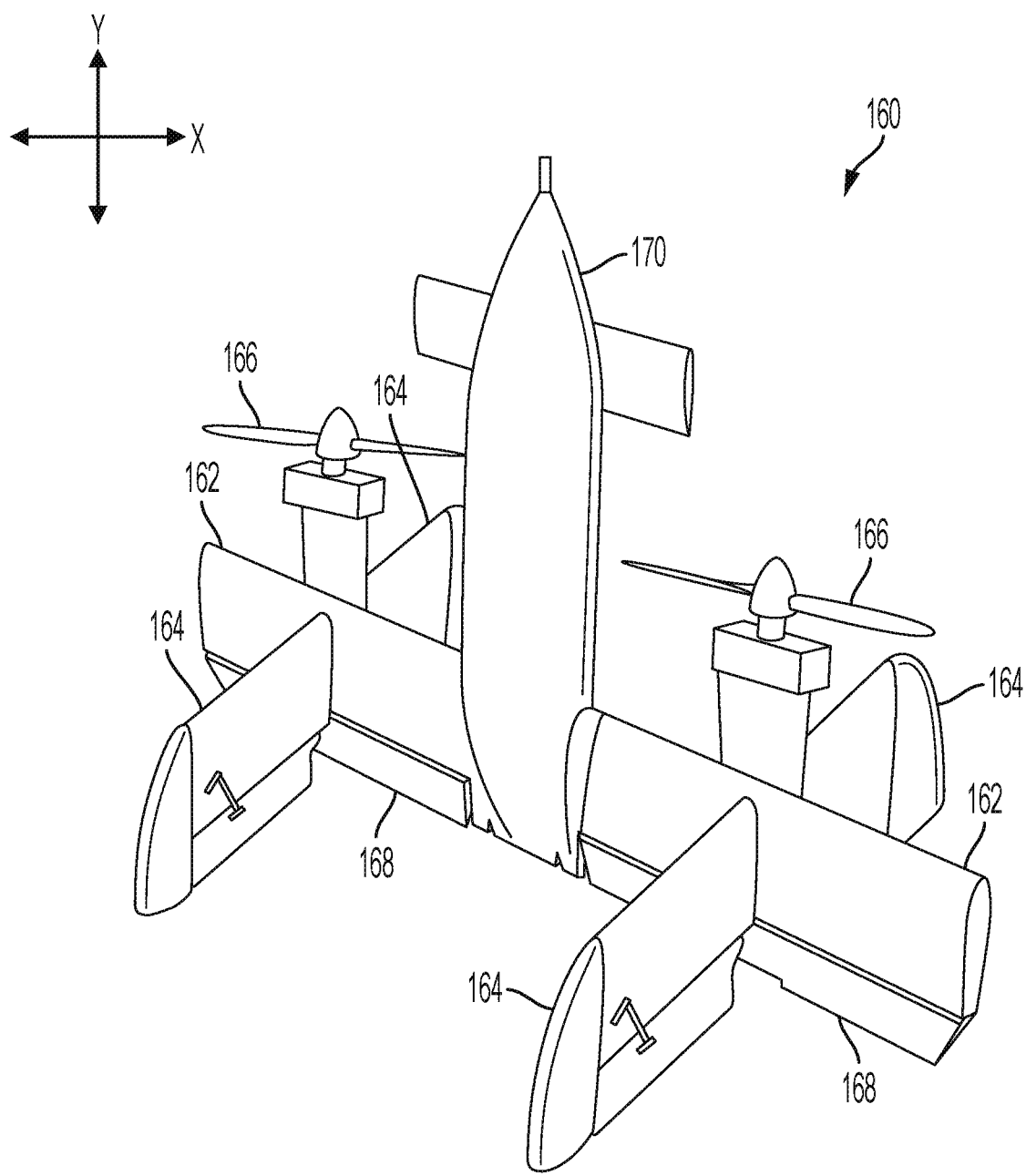
FIG. 1D is a simplified illustration of a UAV, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
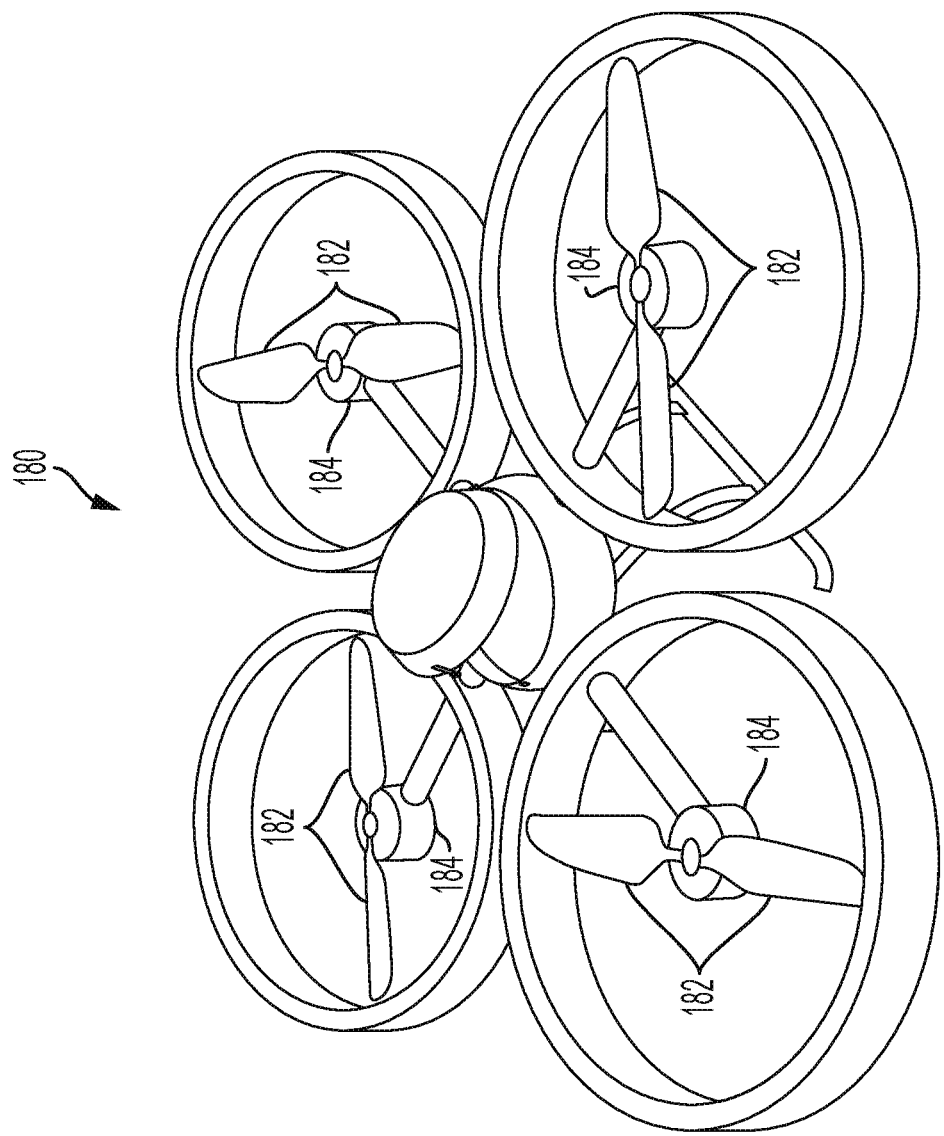
FIG. 1E is a simplified illustration of a UAV, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
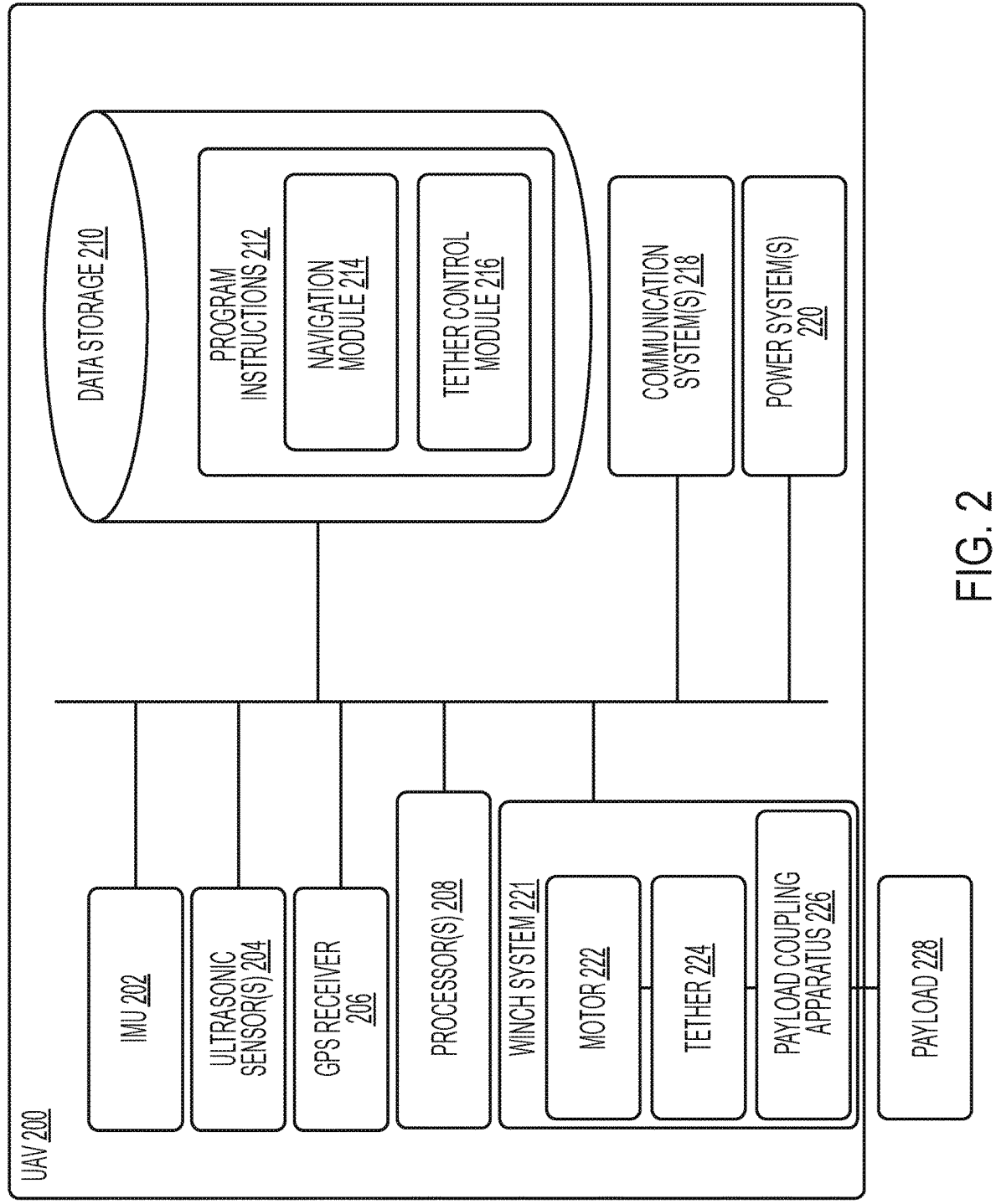
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In some embodiments, the control system 1120 may take the form of program instructions 212 and the one or more processors 208.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
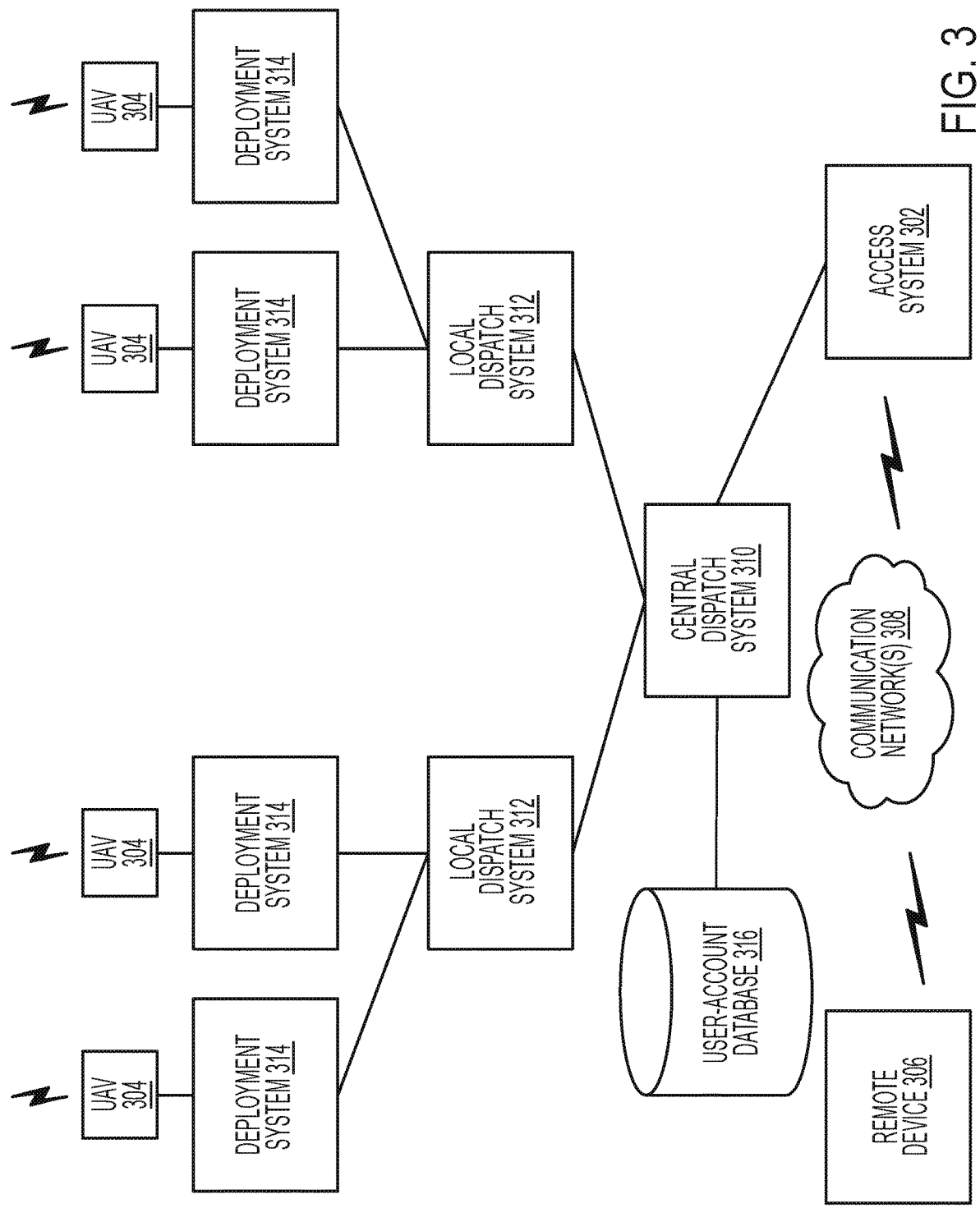
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Illustrative Propellers

Figure 4A:
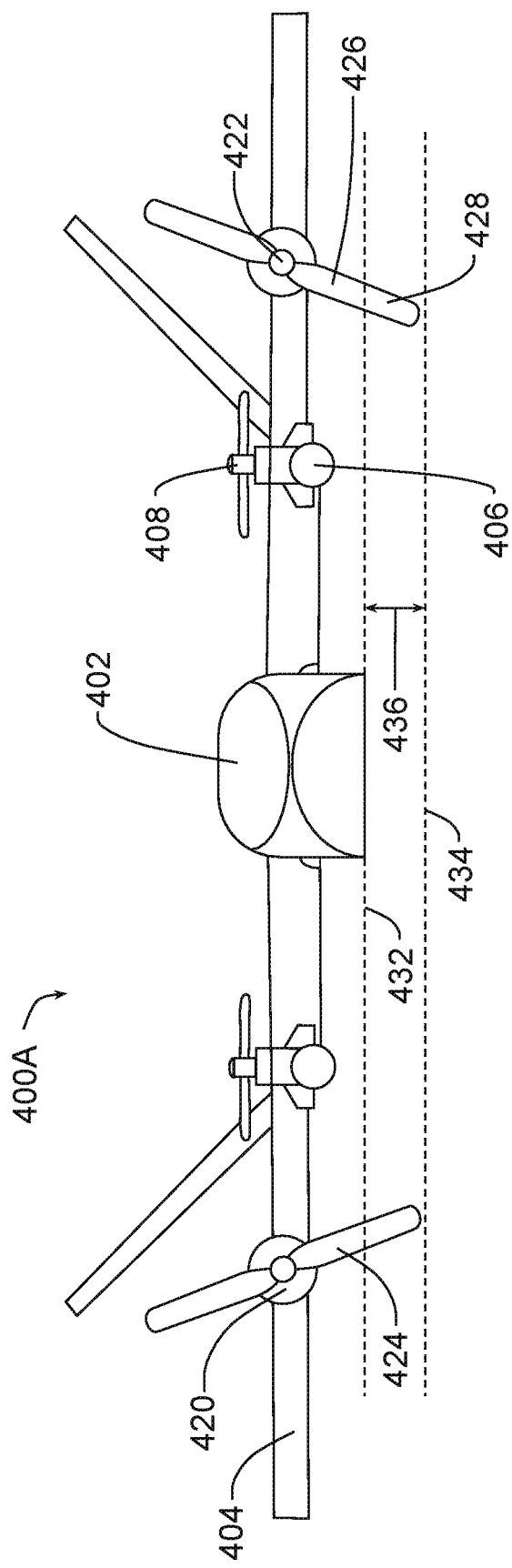
FIG. 4A illustrates a UAV with forward thrust propellers, according to an example embodiment.
Figure 4B:
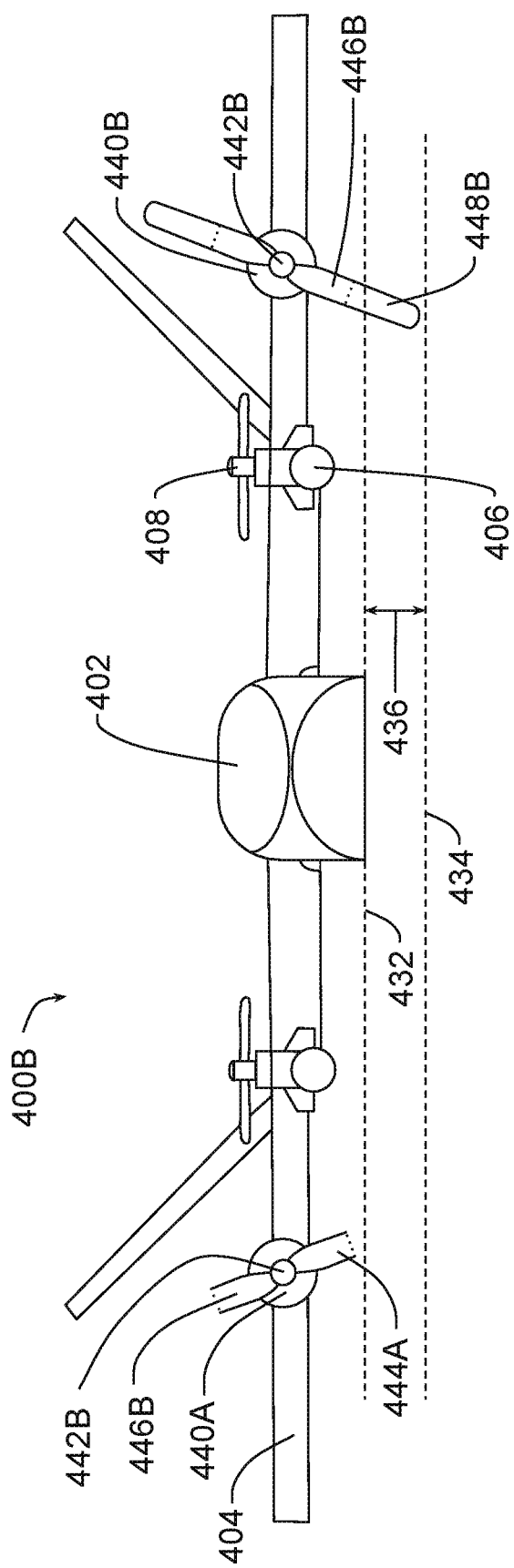
FIG. 4B illustrates a UAV with forward thrust propellers, according to an example embodiment.

FIG. 4A illustrates a UAV 400A and FIG. 4B illustrates a UAV 400B. More particularly, FIGS. 4A and 4B provide a front view of the UAVs 400A-B. The UAVs 400A-B includes a fuselage 402. The fuselage 402 may include a retractable tether system that includes a winch, a retractable tether, and a payload coupling apparatus, for example. The UAVs 400A-B also includes wings 404 that are coupled to the fuselage 402. Moreover, the UAVs 400A-B includes booms 406 that are coupled to the wings 404. The UAVs 400A-B also includes a first plurality of propeller units 408. The first plurality of propeller units 408 may also be lift propeller units, lift propellers, vertical propulsion units 408 and may be part of a lift propulsion system. The propeller units 408 may provide and control lift to the UAVs 400A-B during flight operations.

The UAVs 400A-B may be similar to other UAVs described herein, such as UAV 100 in FIG. 1A. The UAVs 400A-B may have similar function as UAV 100, and may include similar components to UAV 100, for example. More particularly, in some embodiments, propeller units 408 may be the same or similar to vertical propulsion units 110 of FIG. 1A. Additionally, the UAV 400A is similar to the UAV 400B and may have similar components, but may also have different components, such as those described herein.

As shown in FIG. 4A, the UAV 400A also includes a second plurality of propeller units 420. The propeller units 420 may also be considered thrust propeller units, thrust propellers, or horizontal propulsion units 420. Although two thrust propeller units 420 are depicted, in some examples there may only be a single thrust propeller unit, while other examples may include more than two thrust propeller units. Each thrust propeller unit 420 includes a hub 422 and a propeller blade 424. As depicted, the thrust propeller units 420 include two rotor blades, but it should be understood that other number of propeller blades are considered and possible without departing from the scope described herein. Each propeller blade 424 includes a proximate portion 426 that is coupled to the hub 422. The proximate portion 426 may also be considered the root 426 of the propeller blade 424. Furthermore, each propeller blade 424 includes a distal portion 428 that is coupled to the proximate portion 426. The distal portion 428 may also be considered the tip 428 of the propeller blade 424.

The thrust propeller units 420 sweep-out a disk area when the thrust propeller units 420 are operated. A larger disk area may be desirable in order to be efficient as well as provide the UAV 400A with greater thrust. A propeller with a larger diameter (or radius) has a larger disk area. However, the dimensions and parameters of the UAV 400A may result in a limit on the size of the propeller that can be utilized. For example, the UAV 400A may land on a landing surface, a ground surface, a landing structure, a landing pad or similar. In some examples, the fuselage 402 may contact the landing surface when the UAV 400A lands. Other times and in other examples, the boom 406 or other landing gear (not shown) may contact the landing surface when the UAV 400A lands. However, thrust propellers 420, and particularly a portion of the propeller blade 424, such as the distal portion 428, may extend beyond the portion of the UAV 400A that regularly and is designed to contact the landing surface during a landing operation. In this way, the propeller blade 424 may strike the landing surface causing damage to the landing surface and/or the propeller unit 420.

FIG. 4A illustrates this potential conflict between the propeller units 420 and the landing surface. For example, if the UAV 400A were to land on a landing surface by contacting the landing surface with the fuselage 402, the landing surface may be at a first vertical distance 432. However, the thrust propellers 420 may sweep-out a disk area that extends to a second vertical distance 434. The second vertical distance 434 may be lower than the first vertical distance 432 by a distance 436. Thus, when the UAV 400A lands, the propeller blade 424 may strike the landing surface at the first vertical distance 432.

FIG. 4B illustrates the UAV 400B wherein a second plurality of propellers 440A-B (or thrust propellers 440A-B, etc.) with a first thrust propeller 440A and a second thrust propeller 440B have replaced the second plurality of propellers 420 of the UAV 400A in FIG. 4A. As noted above, while two thrust propellers 440A-B are depicted, one thrust propeller and more than two thrust propellers are considered without departing from the scope described herein. Both of the thrust propellers 440A-B include a propeller blade 444A-B coupled to a hub 442A-B, respectively. Further, both of the thrust propellers 440A-B include a propeller blade 444A-B that includes a proximate portion 446A-B coupled to the hub 442A-B and a distal portion 448A-B that is coupled to the proximate portion 446A-B.

Within examples, the distal portion 448A-B is movably coupled to the proximate portion 446A-B. For example, the distal portion 448A-B may rotate relative to the proximate portion 446A-B. By the distal portion 448A-B rotating, or otherwise moving relative to the proximate portion 446A-B, a disk area of the thrust propellers 440A-B may be variable. In some embodiments, depending on the operation undertaken by the UAV 400B, the thrust propellers 440A-B may have at least a first disk area and a second disk area. For example, during a takeoff or landing flight operation, the thrust propellers 440A-B may be arranged similar to how thrust propeller 440A is shown in FIG. 4B. In FIG. 4B, the distal portion 448A of the propeller blade 444A is not in view as it has rotated relative to the proximate portion. In this regard, the propeller blade 444A does not conflict with the first vertical distance 432, which may be the position of the landing surface. During a forward flight operation, for example, the distal portion 448B may rotate out to become aligned with the proximate portion 446B of the propeller blade 444B as shown by the arrangement of the thrust propeller 440B. As shown, during the forward flight operation, the propeller blade 444B may sweep out to the second vertical distance 434. As such, the UAV 400B may have the same flight capabilities and efficiencies of the UAV 400A, but also be able to reduce the potential of propeller strikes and damages caused thereby.

During takeoff and landing operations, the thrust propellers 440A-B may not be utilized by the UAV 400B. During forward flight operations, however, the thrust propellers 440A-B are used by the UAV 400B to provide thrust to the UAV 400B. During takeoff, landing, and forward flight operations, the plurality of lift propellers 408 may be utilized to control an elevation of the UAV 400B above a ground surface and/or a landing surface. Further details about disk areas and movement of a distal portion (or tip) of a propeller blade relative to a proximate portion (or root) of the propeller blade are described herein.

Figures 5A, 5B:
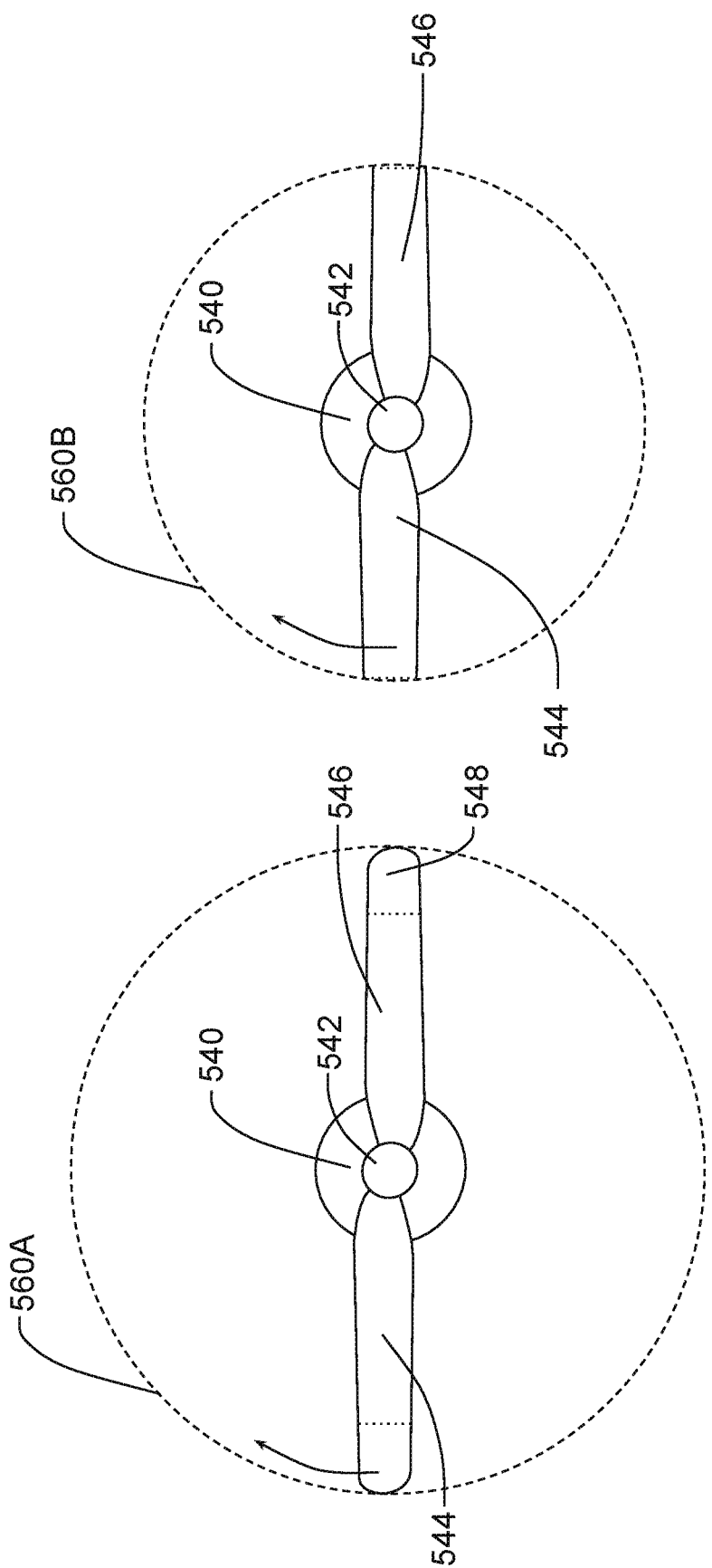
FIG. 5A illustrates a propeller unit with a first disk area, according to an example embodiment.
FIG. 5B illustrates a propeller unit with a second disk area, according to an example embodiment.

FIGS. 5A and 5B a propeller 540. Within examples, the propeller 540 may be a forward thrust propeller coupled to a UAV, such as those UAVs and thrust propellers described herein. The propeller 540 includes a hub 542 and propeller blades 544. Each of the propeller blades 544 includes a proximate portion 546 that is coupled to the hub, as well as a distal portion 548 that is movably coupled to the proximate portion 546.

As shown in FIG. 5A, during some operations, such as forward flight, the propeller 540 may sweep-out a first disk area 560A. During such an operation, the distal portion 548 of the propeller blade 544 may be aligned with the proximate portion 546 of the propeller blade 544. As shown in FIG. 5B, during some other operations, such as takeoff and landing, the propeller 540 may sweep-out a second disk area 560B. During these operations, the propeller blades 544 may be stationary, generally stationary, or only moving at a low RPM. Moreover, during takeoff and landing operations, for example, the distal portion 548 (not shown in FIG. 5B) may be rotated relative to the proximate portion 546 such that only the proximate portion 546 sweeps the second disk area. In such examples, the second disk area 560B of FIG. 5B is smaller than the first disk area 560A. Thus, when a UAV is in forward flight operation the propeller 540 may have a larger disk area (the first disk area 560A) when compared to when the UAV is in a takeoff or landing flight operation and has the second disk area 560B.

Figure 6A:
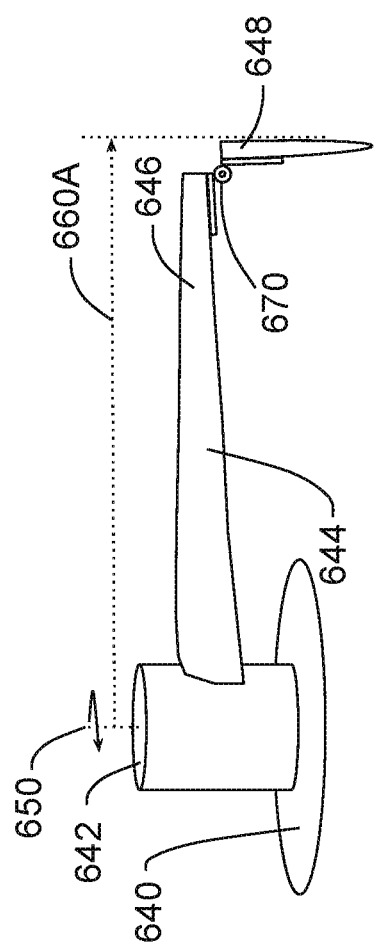
FIG. 6A illustrates a propeller blade, according to an example embodiment.
Figure 6B:
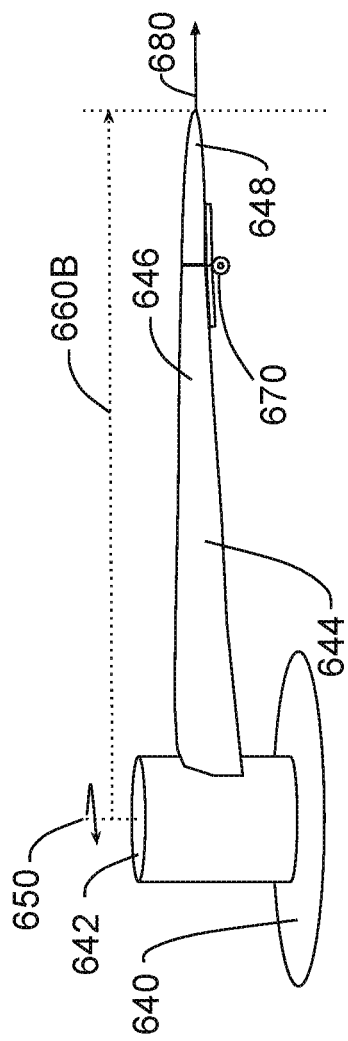
FIG. 6B illustrates a propeller blade, according to an example embodiment.
Figure 6C:
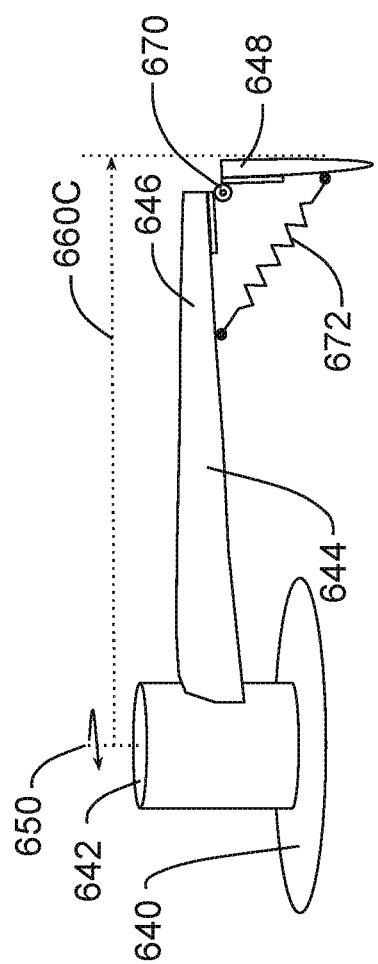
FIG. 6C illustrates a propeller blade, according to an example embodiment.

FIGS. 6A, 6B, and 6C illustrate a propeller unit 640 that includes a hub 642, a propeller blade 644, and a hinge 670. The propeller blade 644 includes a proximate portion 646 coupled to the hub 642 and a distal portion 648 that is movably coupled via the hinge 670 to the proximate portion 646. The propeller unit 640 is configured to rotate about an axis 650. Among other embodiments, the propeller unit 640 may be considered a forward thrust propeller or thrust propeller 640. The thrust propeller 640 may be coupled to a UAV in order to provide forward thrust to the UAV during forward flight. While a single propeller blade 644 is shown, it should be understood that more than one propeller blade can be coupled to the hub 642 and is contemplated herein.

FIG. 6A illustrates the distal portion 648 of the propeller blade 644 askew to the proximate portion 646. In some examples, the distal portion 648 is arranged perpendicularly to proximate portion 646 and/or a plane of rotation created by rotation of the proximate portion 646. In other examples, the distal portion 648 may be arranged parallel or nearly parallel to the axis 650. Other angles and orientations of the distal portion 648 relative to the proximate portion 646 are considered and should be understood. As depicted, the propeller 640 may have an first radius of 660A. In some regards, the first radius 660A may be considered a first effective radius 660A. The effective radius may be the radius of the propeller 640 at a given state. FIG. 6A depicts the propeller 640 when the propeller 640 is not being operated, for example, during takeoff or landing when the propeller 640 is the forward thrust propeller 640. In some examples, FIG. 6A depicts the propeller 640 when the propeller 640 is in a first operational state. The first operational state may include takeoff operation and/or landing operation.

FIG. 6B illustrates the distal portion 648 of the propeller blade 644 aligned with the proximate portion 646. In some examples, the distal portion 648 is arranged perpendicular or nearly perpendicular to the axis 650. In other examples, the distal portion 648 may be aligned with or parallel with a plane of rotation created by the propeller blade 644. As depicted in FIG. 6B, the propeller 640 may have a second radius of 660B. In some examples, the second radius 660B may be considered a second effective radius 660B. The second radius 660B is larger than the first radius 660A, and thus, when the propeller 640 is arranged as shown and described in FIG. 6B, the propeller 640 has a larger disk area than when the propeller 640 is arranged as shown in FIG. 6A. FIG. 6B may be considered to depict the propeller 640 when the propeller 640 is being operated, for example, during forward flight operation. During operation, a centrifugal force 680 acts on the propeller blade 644 as further described below. In some examples, FIG. 6B depicts the propeller 640 when the propeller 640 is in a second operational state. The second operational state may include forward flight operation.

FIG. 6C also illustrates the distal portion 648 of the propeller blade 644 askew to the proximate portion 646, similar to FIG. 6A. Thus, FIG. 6C also depicts the propeller 640 when it is not being operated. However, FIG. 6C also includes a spring 672 coupled between the proximate portion 646 and the distal portion 648 of the propeller blade 644. The spring 672 may bias the distal portion 648 to be in the askew position relative to the proximate portion 646. In this way, the propeller 640 may have a third radius 660C when the propeller 640 is at rest or not being operated. The third radius 660C is less than the second radius 660B and may be similar or the same as the first radius 660A.

In some examples, the hinge 670 may be biased to maintain an askew positioning between the distal portion 648 and the proximate portion 646. In other examples, such as in FIG. 6C, other components such as the spring 672 may bias the distal portion 648 as shown. In yet other examples, the distal portion may be weighted or a weight be distributed across the distal portion 648 such that the distal portion 648 is biased in the askew position. Maintaining a biased positioning of the distal portion 648 relative to the proximate portion 646 provides that the propeller 640 has a smaller radius at rest (e.g., the first radius 660A or the third radius 660C) than during operation (e.g., the second radius 660B). In some examples, the distal portion 648 may not be biased at any orientation and be free to rotate based on the forces experienced by the portions of the propeller blade 644.

Upon operation of the propeller 640, the propeller blade 644 will begin to rotate about the axis 650. The speed at which the propeller 640 rotates is measured by the propeller 640's RPM. As the RPM increases, so does the centrifugal force 680 acting on the propeller blade 644. At a known threshold RPM, the centrifugal force 680 will become greater than any bias and thus cause the distal portion 648 to come into alignment with the proximate portion 646. Thus, the centrifugal force 680 causes the disk area of the propeller to increase from a first disk area defined by the first radius 660A to a second disk area defined by the second radius 660B, for example.

In some examples, the operational states of a UAV and propellers coupled thereto may correspond to a threshold number of RPM. For example, when the propeller 640 is in a first operational state, such as in FIG. 6A, the propeller 640 may be operating at zero RPM or at a value below the threshold RPM. In another example, when the propeller 640 is in a second operational state, such as in FIG. 6B, the propeller 640 may be operating at or greater than the threshold RPM. Moreover, the threshold RPM may correspond to a magnitude of the centrifugal force 680 that causes the distal portion 648 to align with the proximate portion 646. In other examples, the distal portion 648 may be considered to extend or fold-out to come into alignment with the proximate portion 646. The centrifugal force 680 causes the distal portion 648 to move relative to the proximate portion 646 of the propeller blade 644.

Figure 7:
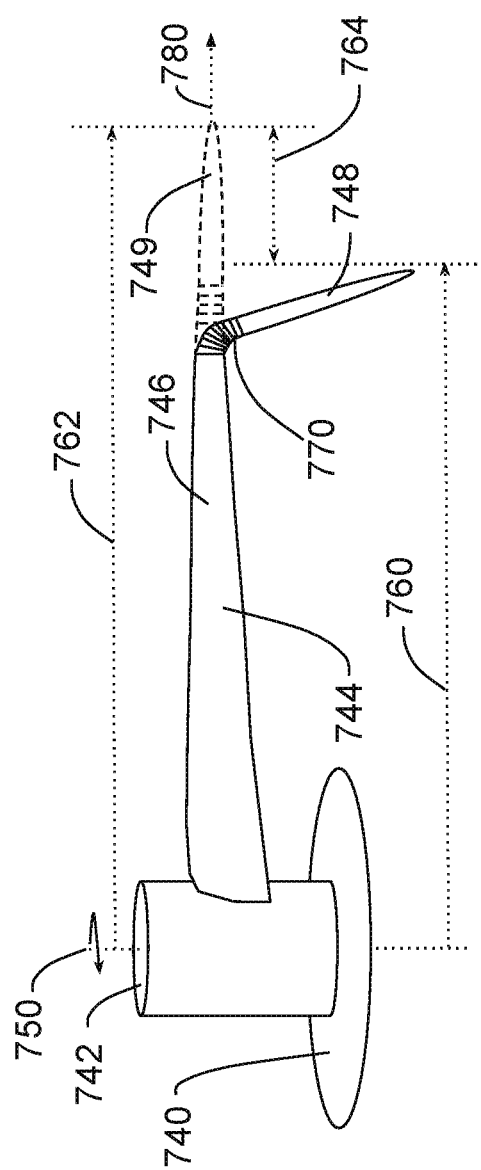
FIG. 7 illustrates a propeller blade, according to an example embodiment.

FIG. 7 illustrates a propeller 740. The propeller 740 may be considered the thrust propeller 740. The thrust propeller 740 includes a hub 742 and a propeller blade 744. The propeller 740 rotates about an axis 750. The propeller blade 744 includes a proximate portion 746 and a distal portion 748. The proximate portion 746 is coupled to the hub 742. The distal portion 748 is coupled to the proximate portion 746 via a flexure 770. The distal portion 748 may be at an angle or askew to the proximate portion 746 when the propeller 740 and/or when the UAV coupled to the propeller 740 is in a first operational state. The first operational state may include takeoff and/or landing operations. The propeller 740 may have a first radius 760 that corresponds to a first disk area when in the first operational state. The flexure 770 may be constructed such that the flexure 770 biases distal portion 748 relative to the proximate portion 746 when in the first operational state.

During a second operational state, which may include forward flight operation, a centrifugal force 780 may cause the flexure 770 to bend and the distal portion 748 to become more aligned with the proximate portion 746. In at least some examples, the distal portion 748 may become generally parallel with the proximate portion 746. In some regards, the propeller blade 744 may be considered extendable as the effective radius of the propeller blade 744 increases as the centrifugal force 780 acting on the propeller blade 744 increases. During the second operational state, the propeller 740 may have a second radius 762 that corresponds to a second disk area. The second radius 762 is longer than the first radius 760 as illustrated by radial distance 764. While described and depicted in terms of the radius, it should be understood that the propellers described also have a diameter with similar characteristics as the radius.

One example UAV system may include a plurality of lift propellers that are a configured to provide lift to the UAV and a plurality of thrust propellers, such as the propeller 740 (FIG. 7) or the propeller 640 (FIGS. 6A-6C), that are configured to provide thrust to the UAV. The lift propellers may be a first plurality of propellers that operate during at least one of a takeoff or landing operation. The thrust propellers may be a second plurality of propellers that operate during forward flight operation of the UAV, but may not operate during takeoff or landing operations.

Figure 8:
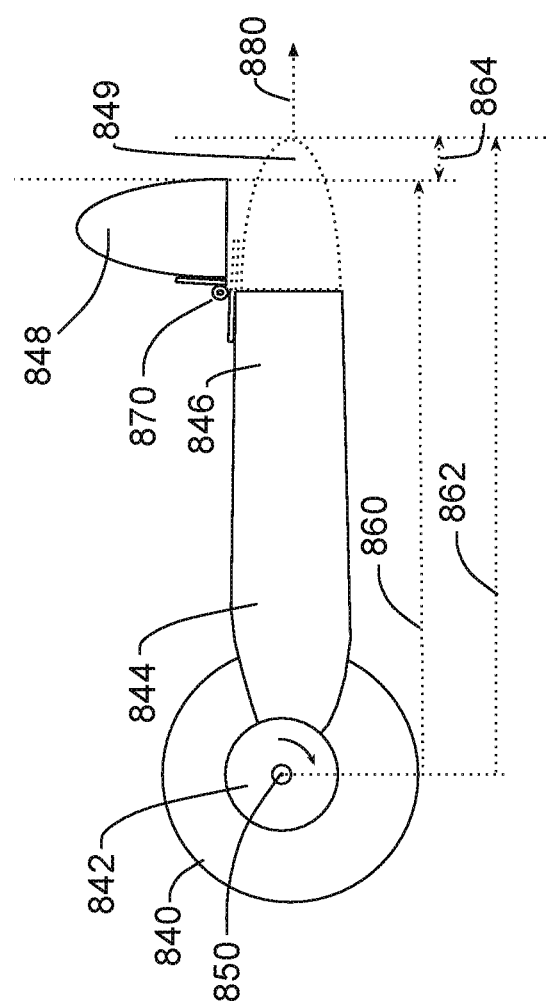
FIG. 8 illustrates a propeller blade, according to an example embodiment.

FIG. 8 illustrates a propeller 840, according to an example embodiment. The propeller 840 may be considered the thrust propeller 840. The thrust propeller 840 includes a hub 842 and a propeller blade 844 and is configured to rotate about an axis 850. The propeller blade 844 includes a proximate portion 846 and a distal portion 848. The distal portion 848 is coupled to the proximate portion 846 via a hinge 870. As depicted, when in a first operational state, the distal portion 848 may be askew to the proximate portion 846, but remain in the same rotational plane as the proximate portion 846. The distal portion 848 may include a weight distribution across the distal portion 848 such that a centrifugal force 880 causes the distal portion 848 to move relative to the proximate portion 846 and in some examples, come into alignment with the proximate portion 846.

When the propeller 840 (and, correspondingly a UAV that the propeller 840 is coupled to) is in a first operational state, the propeller 840 may have a first radius 860. Upon reaching a second operational state wherein the centrifugal force 880 has caused the distal portion 848 to move relative to the proximate portion 846, the propeller 840 may have a second radius 862. The second radius 862 may be a radial distance 864 longer than the first radius 860. The first radius 860 may correspond to a first disk area and the second radius 862 may correspond to a second disk area. The second disk area may be larger than the first disk area. As illustrated, the distal portion 848 may move to be in a position 849 when in the second operational state.

Figure 9:
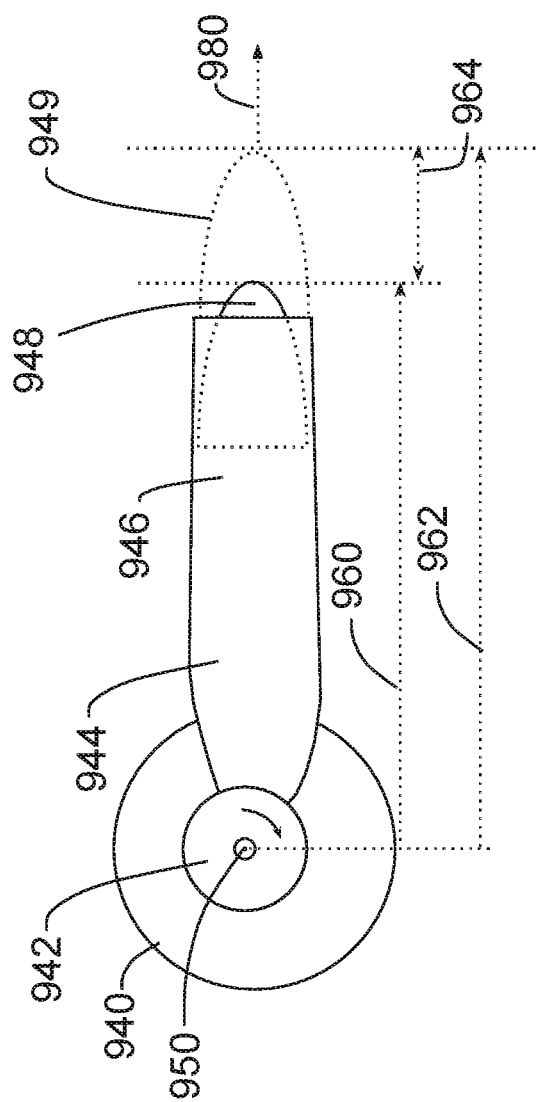
FIG. 9 illustrates a propeller blade, according to an example embodiment.

FIG. 9 illustrates a propeller 940, according to an example embodiment. The propeller 940 may be considered the thrust propeller 940. The thrust propeller 940 includes a hub 942 and propeller blade 944 and is configured to rotate about an axis 950. The propeller blade 944 includes a proximate portion 946 and a distal portion 948. The propeller blade 944 may be telescopic with the distal portion 948 configured to slide into and fit within the proximate portion 946.

In at least one example, the distal portion 948 may be movably coupled to the proximate portion 946 via an interference fit or friction fit. In some other examples, a spring element, spring-like component, or other component may movably couple the distal portion 948 within the proximate portion 946. For example, the spring element may be coupled to the distal portion 948 and the hub 942 or an internal portion of the propeller blade 944. In yet other examples, the distal portion 948 may move within the proximate portion 946, but may be restricted from coming apart from the proximate portion 946. At least a portion of the proximate portion 946 of the propeller blade 944 may be hollow or otherwise include a cavity in which the distal portion 948 may fit, or partially fit, within. As depicted, when in a first operational state, the distal portion 948 may be within or mostly within the proximate portion 946. The distal portion 948 may also be within the same rotational plane as the proximate portion 946.

A centrifugal force 980 may cause the distal portion 948 to move radially outwards away from the hub 942, and thus increase a disk area of the propeller 940. In some examples, the distal portion 948 may move and increase the disk area of the propeller 940 when the centrifugal force 980 is greater than a friction force between the distal portion 948 and a cavity of the proximate portion 948. In other examples, the distal portion 948 may move and increase the disk area of the propeller 940 when the centrifugal force 980 is greater than a spring force of spring element coupled between the distal portion 948 and another component of the propeller 940. In this regard, when the propeller 940 (and, correspondingly a UAV that the propeller 940 is coupled to) is in a first operational state, the propeller 940 may have a first radius 960. Upon reaching a second operational state wherein the centrifugal force 980 has caused the distal portion 948 to move relative to the proximate portion 946, the propeller 940 may have a second radius 962. The second radius 962 may be a radial distance 964 longer than the first radius 960. The first radius 960 may correspond to a first disk area and the second radius 962 may correspond to a second disk area. The second disk area may be larger than the first disk area. As illustrated, the distal portion 948 may move into a position 949 when in the second operational state.

While FIGS. 4A, 4B, 5A, 5B, 6A, 6B, 6C, 7, 8, and 9, describe that the distal portion of the thrust propeller blade is movable relative to the proximate portion of the thrust propeller blade, it is contemplated herein that a distal portion of a lift propeller blade can be movable relative to a proximate portion of the lift propeller blade without departing from the scope of the invention. Thus, while thrust propellers have generally been used as examples herein, it should be noted that lift propellers may also operate utilizing the same ideas described herein. The lift propellers may experience a centrifugal force that causes a disk area of the lift propeller blades to increase when the lift propellers operate above a threshold RPM. Similarly, the lift propellers may include extendable propeller blades (like those described above) that extend upon operation above the threshold RPM.

The threshold RPM may correspond to a centrifugal force that overcomes any other forces acting on the distal portion such that the distal portion moves relative to the proximate portion of the propeller blade. Such a centrifugal force may act upon the lift propellers during the same, or during different operations as when a centrifugal force is acting on the thrust propellers. For example, during takeoff, landing, or a hover operation, a centrifugal force acting on the lift propellers may cause the lift propellers to increase in disk area. The centrifugal force acting on the lift propellers may cause lift propeller blades to increase in length or extend. Similarly, during other operations that do not utilize the lift propellers, or operate the lift propellers below the threshold RPM, the lift propellers may have a smaller disk area than during takeoff, landing, or hovering operations. For example, during forward flight operation the lift propellers may have a smaller disk area (and/or smaller effective blade length). A reduction in disk area of the lift propellers may result in a decrease in drag on the UAV when the UAV is in forward flight operation. It should be noted that a hover operation may be part of, or separate from, the takeoff or landing operations undertaken by the UAVs described throughout this description.

More specifically, for example, a plurality of lift propellers may be similar in form and function as the propeller 640 of FIG. 6A-6C, the propeller 740 of FIG. 7, the propeller 840 of FIG. 8, and/or the propeller 940 of FIG. 9. For example, a lift propeller may include a hub coupled to a propeller blade and the propeller may be configured to operate about an axis. The propeller blade of the lift propeller may include a proximate portion and a distal portion. The distal portion may be configured such that the distal portion is movable relative to the proximate portion. The lift propeller may include a hinge or a flexure between the distal portion and the proximate portion, or may be telescopic, among other possibilities that will be apparent to one of skill in the art.

The extendable propeller blades described herein are not limited to a lift propeller or a thrust propeller as described herein. Thus, some exemplary UAVs may include lift propulsion units that include extendable propeller blades and thrust propulsion units that include extendable propeller blades. Other UAVs may include extendable propeller blades as part of one propulsion system, but not the other. Additionally, it is contemplated that extendable propeller blades may be included on some, but not all, lift propeller units or thrust propeller units of a UAV, for example. It may be desirable to have a portion of lift propeller units include extendable blades, for example.

Figure 10:
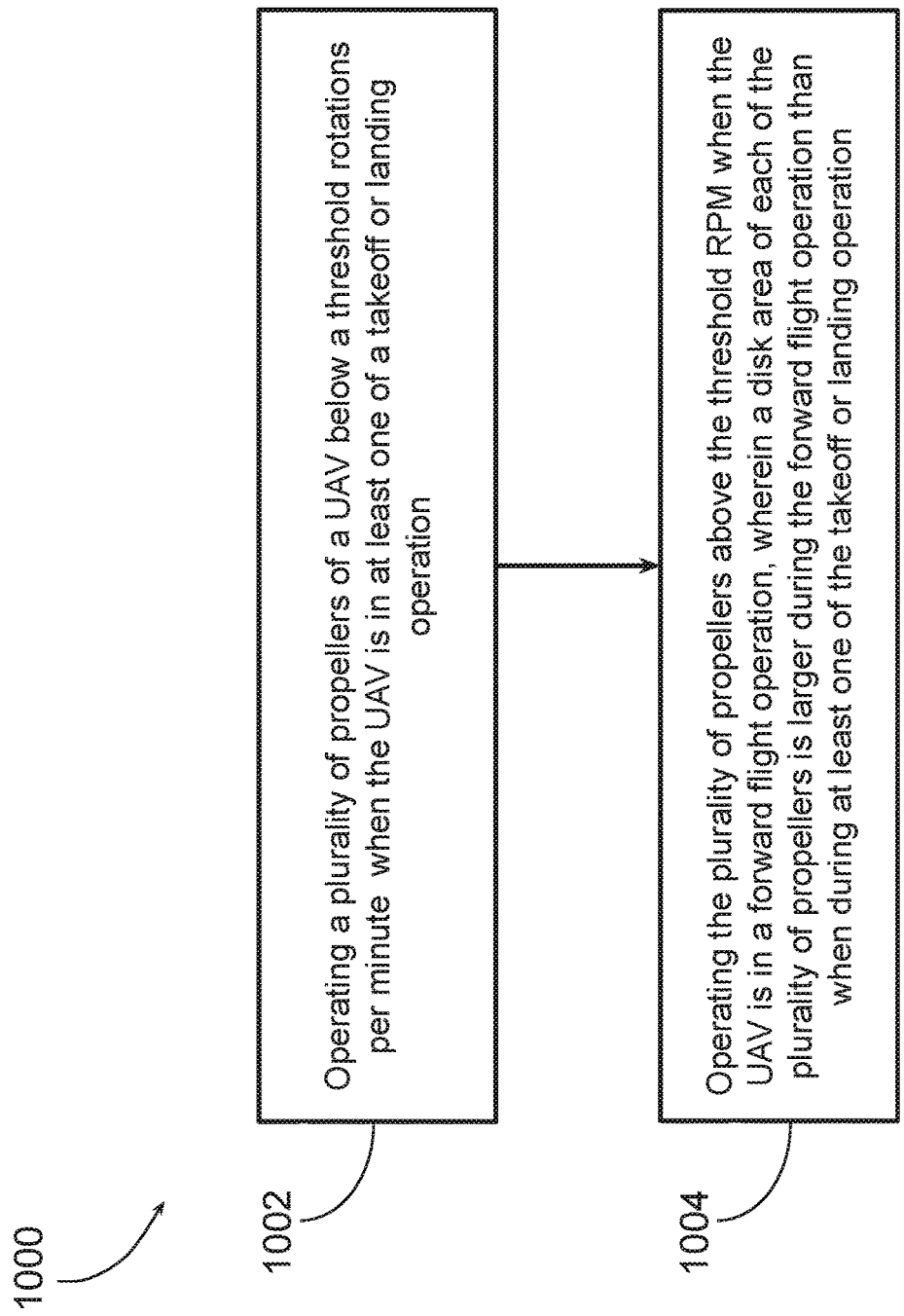
FIG. 10 is a simplified block diagram illustrating a method relating to operating propellers of a UAV based on a flight operation, according to an example embodiment.

FIG. 10 is a simplified block diagram illustrating a method 1000 relating to operating propellers of a UAV based on a flight operation, according to an example embodiment. It should be understood that example methods, such as method 1000, might be carried out by one or more entities, or combinations of entities (i.e., by other computing devices, and/or combinations thereof), without departing from the scope of the invention.

For example, functions of the method 1000 may be fully performed by a machine, a human operator, a computing device (or components of a computing device such as one or more processors or controllers), or may be distributed across multiple components of the computing device, across multiple computing devices, and/or across one or more servers. In some examples, the computing device may receive information from input commands initiated by an operator, sensors of the computing device, or may receive information from other computing devices that collect the information. More particularly, functions of the method 1000 may be carried out by computing device(s) and/or controller(s) of a UAV, or that of a UAV system or network, or a combination thereof.

As shown by block 1002, the method 1000 includes operating a first plurality of propellers of a UAV below a threshold RPM when the UAV is in a first operational state, which includes a takeoff or landing operation. The UAV may include a second plurality of propellers that are operated when the UAV is in the first operational state. The second plurality of propellers may provide lift to the UAV, for example. Each propeller of the first plurality of propellers includes a distal portion that is movably coupled to a proximate portion.

As shown by block 1004, the method 1000 also includes operating the first plurality of propellers at or above the threshold RPM when the UAV is in a second operational state, such as a forward flight operation. Each of the first plurality of propellers has a disk area, and the disk area of the propellers may be larger during the second operational state when compared to the disk area during the first operational state.

The threshold RPM described in method 1000 may be based on a threshold centrifugal force. When a centrifugal force greater than or equal to the threshold centrifugal force is experienced by the first plurality of propellers, the centrifugal force causes the disk area of each of the first plurality of propellers to be greater during forward flight than during at least one of the takeoff or landing operations.

In other embodiments, the method 1000 may include operating the second plurality of propellers of the UAV below a second threshold RPM when the UAV is in the second operational state, which may include forward flight. Each propeller of second plurality of propellers may include a distal portion that is movable coupled to a proximate portion. In such a case, the method may further include operating the second plurality of propellers above the second threshold RPM when the UAV is in the first operational state, which may include takeoff or landing. In other examples, the first operational state also includes hovering.

The method 1000 may include reducing a disk area of a plurality of lift propellers when the UAV begins forward flight operation. In such an example, the method 1000 could include reducing a disk area of the plurality of lift propellers when the UAV stops a takeoff, hover, or landing operation.

The method 1000 may also include increasing a disk area of a plurality of thrust propellers when the UAV begins forward flight operation. In such an example, the method 1000 could include increasing a disk area of the plurality of thrust propellers when the UAV stops a takeoff, hover, or landing operation.

The method 1000 may include increasing a disk area of a plurality of lift propellers when the UAV begins a takeoff, hover, or landing operation. In such an example, the method 1000 could include increasing a disk area of the plurality of lift propellers when the UAV stops a forward flight operation. The method 1000 may also include reducing a disk area of a plurality of thrust propellers when the UAV begins the takeoff, hover, or landing operation. In such an example, the method 1000 could include reducing a disk area of the plurality of thrust propellers when the UAV stops forward flight operation. Other combinations of these steps will be apparent to one of skill in the art.

In other embodiments the method 1000 may include more or less blocks as well as blocks that carry out various functions described herein. Also, while the blocks are expressed in a specific order herein, other ordering and combinations of the various blocks and steps are considered herein.

VI. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. An unmanned aerial vehicle ("UAV") comprising:
   a lift propulsion system including a plurality of lift propellers configured to provide lift to the UAV; and
   a thrust propulsion system including a thrust propeller in an orientation different from the lift propellers and configured to provide thrust to the UAV, wherein only the thrust propulsion system includes expandable propeller blades, and wherein a centrifugal force acting on each expandable propeller blade causes a thrust propeller disk area to increase from a first disk area when the UAV is in a first operational state to a second disk area when the UAV is in a second operational state.

2. The UAV of claim 1, wherein when the UAV is in the first operational state, the plurality of lift propellers are providing lift to the UAV but the thrust propeller is not providing thrust to the UAV.

3. The UAV of claim 1, wherein when the UAV is in the second operational state, the plurality of lift propellers are providing lift to the UAV and the thrust propeller is providing thrust to the UAV.

4. The UAV of claim 1, wherein the first operational state comprises at least one of a takeoff or landing operation.

5. The UAV of claim 1, wherein the second operational state comprises a forward flight operation.

6. The UAV of claim 1, wherein the thrust propeller disk area is the first disk area when the thrust propeller is operating below a threshold rotations per minute ("RPM") and the thrust propeller disk area is the second disk area when the thrust propeller is operating at or above the threshold RPM.

7. The UAV of claim 1, wherein when the UAV is in the first operational state, the thrust propeller is operating below a threshold rotations per minute ("RPM").

8. The UAV of claim 1, wherein each expandable propeller blade comprises a proximate portion coupled to the hub and a distal portion coupled to the proximate portion, wherein the centrifugal force causes the distal portion to move relative to the proximate portion.

9. The UAV of claim 8, wherein when the thrust propeller disk area is the first disk area, the distal portion is askew to the proximate portion, and wherein when the thrust propeller disk area is the second disk area, the centrifugal force causes the distal portion to come into alignment with the proximate portion.

10. A method, comprising:
    operating a lift propulsion system of an unmanned aerial vehicle ("UAV") including lift propellers during a first operational state that includes at least one of a takeoff or landing operation;
    operating a thrust propulsion system of the UAV such that a thrust propeller rotates below a threshold rotations per minute ("RPM") when the UAV is in the first operational state, wherein the thrust propeller has an orientation different from the lift propellers; and
    operating the thrust propulsion system such that the thrust propeller rotates above the threshold RPM when the UAV is in a second operational state that includes a forward flight operation, wherein a disk area of the thrust propeller is larger during the forward flight operation than during at least one of the takeoff or landing operation.

11. The method of claim 10, wherein the threshold RPM is based on a threshold centrifugal force, wherein a centrifugal force greater than or equal to the threshold centrifugal force causes the disk area to be larger during forward flight operation than during at least one of the takeoff or landing operation.

12. The method of claim 10, wherein the thrust propeller comprises an extendable propeller blade such that a diameter of the thrust propeller is larger during the second operational state that during the first operational state.

13. The method of claim 10, wherein the thrust propeller comprises a propeller blade that comprises a proximate portion coupled to a hub and a distal portion that is movably coupled to the proximate portion.

14. The method of claim 13, wherein a centrifugal force acting on the propeller blade during the second operational state causes the distal portion of the thrust propeller to move relative to the proximate portion.

15. The method of claim 13, wherein the distal portion of the propeller blade is movably coupled to the proximate portion such that a length of the propeller blade is longer during the second operational state than during the first operational state.

* * * * *